(12) United States Patent
Wang et al.

(10) Patent No.: US 11,640,730 B2
(45) Date of Patent: May 2, 2023

(54) METHOD AND APPARATUS FOR CONFIGURING AUTOMOBILE DIAGNOSTIC FUNCTION AND AUTOMOBILE DIAGNOSTIC DEVICE

(71) Applicant: AUTEL INTELLIGENT TECHNOLOGY CORP., LTD., Guangdong (CN)

(72) Inventors: Weilin Wang, Guangdong (CN); Jiasheng Zhong, Guangdong (CN); Guilin Ding, Guangdong (CN); Longhui Zhong, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 268 days.

(21) Appl. No.: 16/943,766

(22) PCT Filed: Jan. 14, 2019

(86) PCT No.: PCT/CN2019/071542
§ 371 (c)(1),
(2) Date: Jul. 30, 2020

(87) PCT Pub. No.: WO2019/149051
PCT Pub. Date: Aug. 8, 2019

(65) Prior Publication Data
US 2021/0019961 A1 Jan. 21, 2021

(30) Foreign Application Priority Data
Jan. 31, 2018 (CN) .......................... 201810098160.2

(51) Int. Cl.
*G07C 5/08* (2006.01)
*G01M 17/007* (2006.01)

(52) U.S. Cl.
CPC ......... *G07C 5/0808* (2013.01); *G01M 17/007* (2013.01)

(58) Field of Classification Search
CPC ........................... G07C 5/0808; G01M 17/007
See application file for complete search history.

(56) References Cited

U.S. PATENT DOCUMENTS

| 6,664,985 B1 | 12/2003 | Bormann et al. |
| 2016/0311410 A1* | 10/2016 | Donzis ............... G06Q 30/0283 |

(Continued)

FOREIGN PATENT DOCUMENTS

| CN | 105787342 A | 7/2016 |
| CN | 105807757 A | 7/2016 |

(Continued)

OTHER PUBLICATIONS

International Search Report dated Mar. 27, 2019; PCT/CN2019/071542.

(Continued)

*Primary Examiner* — Joseph J Dallo (57) ABSTRACT

The present invention provides a method and an apparatus for configuring an automobile diagnostic function, and an automobile diagnostic device. The method for configuring an automobile diagnostic function includes: obtaining first function configuration information from a server, the first function configuration information including an identifier of at least one automobile diagnostic function; determining an automobile diagnostic function group based on the first function configuration information; and granting use permission of the automobile diagnostic function group in an automobile diagnostic application program. Function configuration information is obtained from the server and then an automobile diagnostic function supported by a product is configured, thereby improving flexibility of automobile (Continued)

diagnostic function configuration and reducing product development and maintenance costs.

15 Claims, 4 Drawing Sheets

(56) References Cited

U.S. PATENT DOCUMENTS

| | | | |
|---|---|---|---|
| 2017/0046048 A1* | 2/2017 | Marshall | G07C 5/0808 |
| 2019/0095078 A1* | 3/2019 | Marshall | H04W 4/80 |
| 2020/0351110 A1* | 11/2020 | Yang | H04L 12/1813 |
| 2021/0014318 A1* | 1/2021 | Xiao | H04L 67/01 |
| 2021/0334892 A1* | 10/2021 | Liu | G06Q 20/405 |

FOREIGN PATENT DOCUMENTS

| | | | | |
|---|---|---|---|---|
| CN | 106878292 A | 6/2017 | | |
| CN | 107291068 A | 10/2017 | | |
| CN | 108303268 A | 7/2018 | | |
| DE | 102019130665 A1 * | 5/2020 | | G06F 21/629 |
| WO | WO-2005039927 A2 * | 5/2005 | | G01M 17/007 |
| WO | WO-2019141121 A1 * | 7/2019 | | G05B 23/0213 |
| WO | WO-2019149051 A1 * | 8/2019 | | G01M 17/007 |
| WO | WO-2021237648 A1 * | 12/2021 | | G07C 5/008 |

OTHER PUBLICATIONS

The First Chinese Office Action dated Mar. 28, 2019; Appln. No. 201810098160.2.

* cited by examiner

METHOD AND APPARATUS FOR CONFIGURING AUTOMOBILE DIAGNOSTIC FUNCTION AND AUTOMOBILE DIAGNOSTIC DEVICE

This application is a continuation application of International Application No. PCT/CN2019/071542, filed on Jan. 14, 2019, which claims priority of Chinese Patent Application No. 201810098160.2, filed on Jan. 31, 2018, which is incorporated herein by reference in its entirety.

BACKGROUND

Technical Field

The present application relates to the technical field of automobile diagnosis, and in particular, to a method and an apparatus for configuring an automobile diagnostic function and an automobile diagnostic device.

Related Art

As an automotive automation degree is increasingly high, a computer control system is adopted in an increasing quantity of vehicles, and structures of the vehicles are becoming increasingly complex, causing increasingly complex vehicle faults. Therefore, a higher requirement is imposed on an automobile diagnostic device, and a rapid and accurate diagnostic device with complete functions can more efficiently diagnose a fault in an automobile.

At present, there are various types of automobile diagnostic devices and automobile diagnostic functions that can be provided. Generally, a product model varies, and a diagnostic function of each series of products varies. For example, a device dedicated to diagnosis of a gasoline vehicle, a device dedicated to diagnosis of a commercial vehicle, a device highlighting tire pressure monitoring system (TPMS) and a device highlighting anti-theft function detection are included. According to planning of product functions, which product supports which automobile diagnostic functions is fixedly configured.

In the foregoing manner of configuring an automobile diagnostic function, it is more difficult to change an automobile diagnostic function, resulting in a large variety of products and increasing product development and maintenance costs.

SUMMARY

The present invention provides a method and an apparatus for configuring an automobile diagnostic function and an automobile diagnostic device, to improve the flexibility of configuring an automobile diagnostic function.

The method for configuring an automobile diagnostic function provided in the present invention includes:

obtaining first function configuration information from a server, the first function configuration information including an identifier of at least one automobile diagnostic function;

determining an automobile diagnostic function group based on the first function configuration information; and granting use permission of the automobile diagnostic function group in an automobile diagnostic application program.

The apparatus for configuring an automobile diagnostic function provided in the present invention includes:

an obtaining module configured to obtain first function configuration information from a server, the first function configuration information including an identifier of at least one automobile diagnostic function;

a determining module configured to determine an automobile diagnostic function group based on the first function configuration information; and a configuring module configured to grant use permission of the automobile diagnostic function group in an automobile diagnostic application program.

The automobile diagnostic device provided in the present invention includes a processor, a memory, and a display screen, the memory being configured to store an instruction;

the processor being configured to run the instruction stored in the memory, to perform the method for configuring an automobile diagnostic function provided in any embodiment of the present invention; and the display screen being configured to display a running result of the processor.

The present invention provides a method and an apparatus for configuring an automobile diagnostic function and an automobile diagnostic device. Preset function configuration information is obtained from a server, and use permission of an automobile diagnostic function group is automatically granted in an automobile diagnostic application program based on a to-be-configured automobile diagnostic function in the function configuration information, thereby improving flexibility of configuring an automobile diagnostic function. In addition, product types are reduced, thereby reducing product development and maintenance costs.

BRIEF DESCRIPTION OF THE DRAWINGS

To describe the technical solutions in the embodiments of the present invention or in the existing technology more clearly, the following briefly describes the accompanying drawings required for describing the embodiments or the existing technology. Apparently, the accompanying drawings in the following description show some embodiments of the present invention, and persons of ordinary skill in the art may still derive other drawings from these accompanying drawings without creative efforts.

DETAILED DESCRIPTION

In order to make the objectives, technical solutions, and advantages of the present disclosure more comprehensible, the technical solutions according to embodiments of the present invention are clearly described in the following with reference to the accompanying drawings. Apparently, the embodiments in the following description are merely some rather than all of the embodiments of the present invention. All other embodiments obtained by a person of ordinary skill in the art based on the embodiments of the present invention without creative effects shall fall within the protection scope of the present disclosure.

Figure 1:
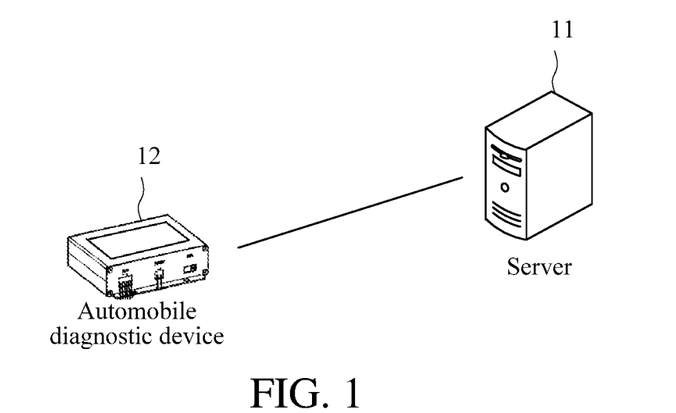
FIG. 1 is an architecture diagram of a system according to an embodiment of the present invention.

FIG. 1 is an architecture diagram of a system according to an embodiment of the present invention. As shown in FIG. 1, the system may include a server 11 and an automobile diagnostic device 12. The automobile diagnostic device 12 may establish a wireless network connection or a wired network connection to the server 11 and obtain data from the server. It should be noted that an implementation of the server 11 is not limited in the present invention. For example, the server 11 may be a computer or a cloud server. A model and a type of the automobile diagnostic device 12 are not limited in the present invention.

According to a method and an apparatus for configuring an automobile diagnostic function and an automobile diagnostic device provided in the embodiments of the present invention, preset function configuration information is obtained from a server, a to-be-configured automobile diagnostic function may be automatically configured in a product based on the function configuration information, and use permission of the to-be-configured automobile diagnostic function is granted, thereby improving flexibility of configuring an automobile diagnostic function. This resolves prior-art technical problems of a difficulty in changing an automobile diagnostic function supported by the product and high development and maintenance costs.

Figure 2:
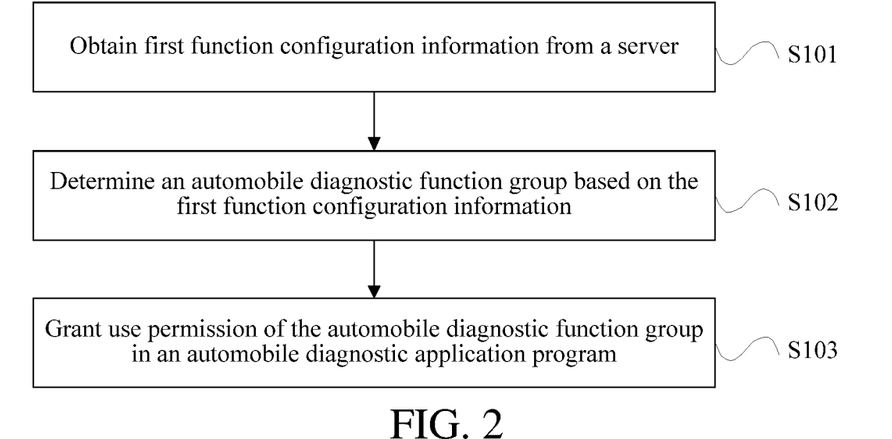
FIG. 2 is a flowchart of a method for configuring an automobile diagnostic function according to Embodiment 1 of the present invention.

FIG. 2 is a flowchart of a method for configuring an automobile diagnostic function according to Embodiment 1 of the present invention. The method for configuring an automobile diagnostic function provided in this embodiment may be performed by an apparatus for configuring an automobile diagnostic function. The apparatus for configuring an automobile diagnostic function may be integrated into an automobile diagnostic device, or the method may be directly performed by an automobile diagnostic device. As shown in FIG. 2, the method for configuring an automobile diagnostic function provided in this embodiment may include the following steps.

S101. First function configuration information is obtained from a server.

The first function configuration information may include an identifier of at least one automobile diagnostic function.

In particular, an automobile diagnostic function corresponds to an identifier of the automobile diagnostic function on a one-to-one basis. The server and the automobile diagnostic device both store a same correspondence. An automobile diagnostic function is not limited in this embodiment. For example, an automobile diagnostic function may include an existing automobile diagnostic function or a newly developed automobile diagnostic function. An implementation of an identifier of an automobile diagnostic function is not limited in this embodiment. For example, the identifier may be only a number, only a letter, or a combination of a number and a letter.

It should be noted that, a quantity of identifiers of automobile diagnostic functions included in the first function configuration information is not limited in this embodiment, and is set as required. For example, there may be seven or eight identifiers of automobile diagnostic functions.

The following provides description through a specific example.

Table 1 shows an example of a correspondence between an automobile diagnostic function and an identifier.

TABLE 1

Automobile diagnostic function and identifier

| Number | Identifier | Automobile diagnostic function | Function description |
|---|---|---|---|
| 1 | 0 | Passenger car diagnosis | Gasoline vehicle diagnosis. There is a main menu entry, and the system UI may have a shortcut menu entry. |
| 2 | 1 | TPMS | There is a main menu entry, and the system UI may have a shortcut menu entry. |
| 3 | 2 | Commercial vehicle diagnosis | Diesel vehicle diagnosis. There is a main menu entry, and the system UI may have a shortcut menu entry. |
| 4 | 3 | Anti-theft | Anti-theft programmer. There are two main menu entries. There may be a shortcut menu entry for anti-theft in the system UI, but there is no shortcut menu entry for the programmer. |
| 5 | 4 | Maintenance | There is a main menu entry. If a commercial vehicle is included, it is necessary to distinguish between two tabs for a passenger car and a commercial vehicle in maintenance. The system UI may have a shortcut menu entry. |
| 6 | 5 | VIN parsing | Vehicle identification number (VIN). There is a main menu entry, and the system UI may have a shortcut menu entry. |
| 7 | 6 | Calibration device | There is a main menu entry, and the system UI may have a shortcut menu entry. |
| 8 | 7 | Heavy truck expert mode | This is uniformly managed through commercial vehicle diagnosis and is specially marked during upgrading. This is not used as a separate main menu, and there is no shortcut menu entry for the system UI. |
| 9 | 8 | Maintenance of a heavy truck | Same as Item 5 |
| ... | ... | ... | ... |
| 17 | G | Toolkit | Tpms toolkit |
| 18 | H | Immo Program | Anti-theft programmer |

Table 2 shows an example of an identifier of an automobile diagnostic function.

In Table 1 and Table 2, the identifier of the automobile diagnostic function may be expressed using the American Standard Code for Information Interchange (ASCII). The ASCII is adopted to indicate the identifier, so that an amount of data transmitted by the server is reduced, resource utilization is improved, a data transmission delay is shortened, and storage space is saved.

TABLE 2

Identifier of an automobile diagnostic function (indicated by ASCII)

| Number | Identifier | Number | Identifier | Number | Identifier |
|---|---|---|---|---|---|
| 0 | "0" | 1 | "1" | 2 | "2" |
| 3 | "3" | 4 | "4" | 5 | "5" |
| 6 | "6" | 7 | "7" | 8 | "8" |
| 9 | "9" | 10 | "A" | 11 | "B" |
| 12 | "C" | 13 | "D" | 14 | "E" |
| 15 | "F" | 16 | "G" | 17 | "H" |
| 18 | "I" | 19 | "J" | 20 | "K" |
| 21 | "L" | 22 | "M" | 23 | "N" |
| 24 | "O" | 25 | "P" | 26 | "Q" |
| 27 | "R" | 28 | "S" | 29 | "T" |
| 30 | "U" | 31 | "V" | | |

Table 3 and Table 4 show examples of the first function configuration information. As shown in Table 3, the first function configuration information includes n+1 identifiers of automobile diagnostic functions, and specific values of the n+1 identifiers are F0, F1, . . . , and Fn. Referring to Table 1 to Table 4, the first function configuration information in a first row of Table 4 is "04". "0" means "passenger car diagnosis" and "4" means "maintenance". A product in this scenario may be mainly applied to a passenger car. The first function configuration information in a second row of Table 4 is "24". "2" means "commercial vehicle diagnosis" and "4" means "maintenance". A product in this scenario may be mainly applied to a commercial vehicle.

TABLE 3

First function configuration information

| F0 | F1 | ... | Fn |
|---|---|---|---|

TABLE 4

First function configuration information

| First function configuration information | Function description |
|---|---|
| "04" | Passenger car + Maintenance |
| "24" | Commercial vehicle + Maintenance |
| "204" | Diesel-Gasoline integrated vehicle + Maintenance |
| "041" | Diagnosis + Maintenance + TPMS |
| "1G04" | TPMS + ToolKit + Diagnosis + Maintenance |
| "304" | Anti-theft + Diagnosis + Maintenance |

Optionally, the first function configuration information may further include a quantity of identifiers of automobile diagnostic functions. Refer to Table 5 and Table 6. In Table 5, Len indicates the quantity of identifiers of automobile diagnostic functions, and other fields are the same as those in Table 3. Compared with Table 4, Table 6 shows that a first field in the first function configuration information is Len.

TABLE 5

First function configuration information

| Len | F0 | F1 | ... | Fn |
|---|---|---|---|---|

TABLE 6

First function configuration information

| First function configuration information | Function description |
|---|---|
| "204" | Passenger car + Maintenance |
| "224" | Commercial vehicle + Maintenance |
| "3204" | Diesel-Gasoline integrated vehicle + Maintenance |
| "3041" | Diagnosis + Maintenance + TPMS |
| "41G04" | TPMS + ToolKit + Diagnosis + Maintenance |
| "3304" | Anti-theft + Diagnosis + Maintenance |

Through the foregoing example, after receiving the first function configuration information, the automobile diagnostic device may determine a corresponding function based on the identifier in the first function configuration information.

S102. An automobile diagnostic function group is determined based on the first function configuration information.

The automobile diagnostic function group includes at least one automobile diagnostic function. A quantity of automobile diagnostic functions included in the automobile diagnostic function group is not limited in this embodiment, and is set as required.

Optionally, in an implementation, the determining an automobile diagnostic function group based on the first function configuration information may include:

determining an automobile diagnostic function corresponding to the identifier of the at least one automobile diagnostic function included in the first function configuration information, and combining M of automobile diagnostic functions corresponding to the identifier of the at least one automobile diagnostic function into the automobile diagnostic function group. M is greater than or equal to 1, and less than a quantity of identifiers of automobile diagnostic functions included in the first function configuration information.

In this implementation, a part of automobile diagnostic functions corresponding to the first function configuration information may be combined into the automobile diagnostic function group, thereby improving flexibility of configuring an automobile diagnostic function.

Optionally, in another implementation manner, the determining an automobile diagnostic function group based on the first function configuration information may include:

determining an automobile diagnostic function corresponding to the identifier of the at least one automobile diagnostic function included in the first function configuration information, and combining the automobile diagnostic function corresponding to the identifier of the at least one automobile diagnostic function into the automobile diagnostic function group.

In this implementation, all of automobile diagnostic functions corresponding to the first function configuration information may be combined into the automobile diagnostic function group, thereby improving integrity of configuring an automobile diagnostic function.

Optionally, the determining an automobile diagnostic function corresponding to the identifier of the at least one automobile diagnostic function included in the first function configuration information may include:

determining, based on a preset correspondence between an identifier of an automobile diagnostic function and the automobile diagnostic function, the automobile diagnostic function corresponding to the identifier of the at least one automobile diagnostic function.

Optionally, the method for configuring an automobile diagnostic function provided in this embodiment may further include:

if there is a second automobile diagnostic function associated with a first automobile diagnostic function in the automobile diagnostic function group, add the second automobile diagnostic function to the automobile diagnostic function group.

The following provides description through an example. For example, a programmer is associated with an anti-theft function. In other words, if there is an anti-theft function, there is a programmer by default. It is assumed that the automobile diagnostic function group includes an anti-theft function but does not include a programmer. In this case, the programmer needs to be added to the automobile diagnostic function group.

Other automobile diagnostic functions associated with the automobile diagnostic functions included in the automobile diagnostic function group are added to the automobile diagnostic group, thereby further improving flexibility and rationality of configuring an automobile diagnostic function.

S103. Use permission of the automobile diagnostic function group is granted in an automobile diagnostic application program.

In particular, application programs or components corresponding to various automobile diagnostic functions may be stored in the automobile diagnostic device in advance. After the to-be-configured automobile diagnostic function group is determined, the use permission of the automobile diagnostic function group is granted in the automobile diagnostic application program for a user.

It should be noted that, a type of the automobile diagnostic application program is not limited in this embodiment. For example, a desktop shortcut menu (System UI, also referred to as a shortcut menu) that is launched at an operating System level may be included. The desktop shortcut menu provides a shortcut menu entry for an automobile diagnostic function, and/or an automobile diagnostic application program (application or APP) installed on the basis of an operating system. The automobile diagnostic application program may display a main menu after startup, and the main menu provides a menu entry for an automobile diagnostic function.

Optionally, the automobile diagnostic device may grant different permission for different automobile diagnostic functions. For example, the automobile diagnostic function group whose permission is determined by the automobile diagnostic device to be granted includes a first automobile diagnostic function and a second automobile diagnostic function.

That the automobile diagnostic device enables permission of the first automobile diagnostic function may include providing an entry for the first automobile diagnostic function on a main menu of an application program corresponding to the first automobile diagnostic function and providing the entry for the first automobile diagnostic function on a shortcut menu.

That the automobile diagnostic device enables permission of the second automobile diagnostic function may include providing an entry for the second automobile diagnostic function on a main menu of an application program corresponding to the second automobile diagnostic function instead of providing the entry for the second automobile diagnostic function on a shortcut menu.

The automobile diagnostic device may determine granted permission of the corresponding automobile diagnostic function based on the determined automobile diagnostic function. In an implementation, as shown in Table 1, Table 1 shows a correspondence between an identifier of an automobile diagnostic function, the automobile diagnostic function, and granted permission of the automobile diagnostic function. The automobile diagnostic device may determine the corresponding automobile diagnostic function and the granted permission of the corresponding automobile diagnostic function based on the identifier in the function configuration information.

It can be learned that, in the method for configuring an automobile diagnostic function provided in this embodiment, application programs or components corresponding to various automobile diagnostic functions may be stored in the automobile diagnostic device in advance. For different automobile diagnostic devices or different application scenarios, only corresponding function configuration information needs to be configured on the server. The first function configuration information is obtained from the server, automobile diagnostic functions to be configured by the automobile diagnostic device may be determined based on the first function configuration information, and the use permission of the automobile diagnostic function group is granted in the automobile diagnostic application program. In this way, flexibility of configuring an automobile diagnostic function is improved, product types are reduced, and product development and maintenance costs are reduced.

Optionally, the method for configuring an automobile diagnostic function provided in this embodiment may further include:

storing the first function configuration information.

The first function configuration information is stored, so that a reference for subsequently configuring an automobile diagnostic function can be provided for an automobile diagnostic device, thereby improving flexibility of configuring an automobile diagnostic function.

Optionally, the storing the first function configuration information may include:

storing the first function configuration information in an encryption chip.

In particular, the encryption chip is a collective name for a type of security chip that integrates various encryption algorithms internally and has a very high security level to ensure that internally stored key and information data cannot be read and tampered illegally. The first function configuration information is stored in the encryption chip, thereby improving security of configuring an automobile diagnostic function.

Optionally, after the first function configuration information is stored, the method for configuring an automobile diagnostic function provided in this embodiment may further include:

obtaining second function configuration information from the server;

determining whether the second function configuration information is consistent with the first function configuration information; and if no, updating the automobile diagnostic function group based on the second function configuration information, and granting use permission of an updated automobile diagnostic function group in the automobile diagnostic application program.

In particular, when an automobile diagnostic function supported by the automobile diagnostic device needs to be updated, the second function configuration information is obtained from the server. If the second function configuration information is inconsistent with the first function configuration information, the automobile diagnostic function group is updated based on the second function configuration information, and the automobile diagnostic device is reconfigured to grant the use permission to the user.

The second function configuration information is obtained, and the automobile diagnostic function supported by the automobile diagnostic device may be updated in real time, thereby improving flexibility of configuring an automobile diagnostic function.

It should be noted that the obtaining the second function configuration information from the server may be triggered periodically or by an event. This is not limited in this embodiment.

A principle of the second function configuration information is similar to that of the first function configuration information, and details are not described herein again.

Optionally, the method for configuring an automobile diagnostic function provided in this embodiment may further include:

deleting the first function configuration information, and storing the second function configuration information.

A principle of storing the second function configuration information is similar to that of storing the first function configuration information, and details are not described herein again.

Optionally, before S102, the method for configuring an automobile diagnostic function provided in this embodiment may further include:

obtaining third function configuration information stored locally.

The automobile diagnostic device is restarted if the third function configuration information is different from the first function configuration information.

The first function configuration information obtained from the server is compared with the third function configuration information stored locally. The automobile diagnostic function is reconfigured based on the first function configuration information only when the first function configuration information is different from the third function configuration information. In this way, repeated configuration is avoided, and efficiency and effectiveness of configuring an automobile diagnostic function are improved.

A principle of the third function configuration information is similar to that of the first function configuration information, and details are not described herein again.

Optionally, the third function configuration information may be default function configuration information when a product is at delivery.

Optionally, the third function configuration information may be the first function configuration information or the second function configuration information obtained by the product last time.

This embodiment provides a method for configuring an automobile diagnostic function, including: obtaining first function configuration information from a server; determining an automobile diagnostic function group based on the first function configuration information; and granting use permission of the automobile diagnostic function group in an automobile diagnostic application program. According to the method for configuring an automobile diagnostic function provided in this embodiment, the first function configuration information is obtained from the server, the to-be-configured automobile diagnostic function group may be determined based on the first function configuration information, and the use permission of the automobile diagnostic function group is granted in the automobile diagnostic application program. In this way, flexibility of configuring an automobile diagnostic function is improved, product types are reduced, and product development and maintenance costs are reduced.

Figure 3:
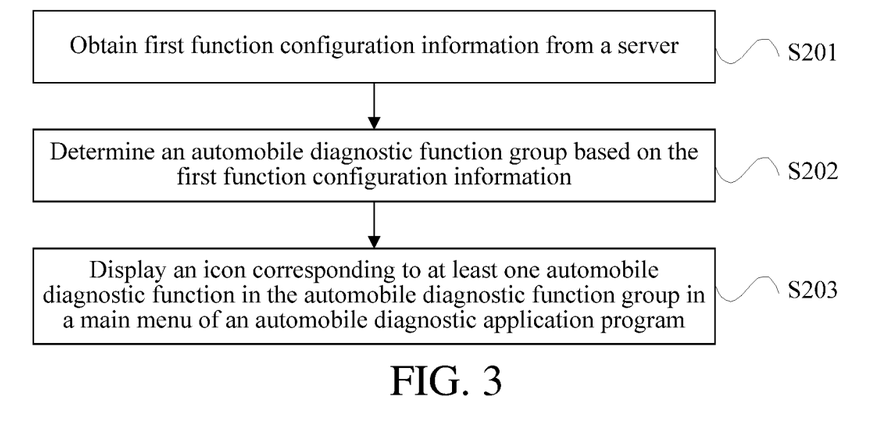
FIG. 3 is a flowchart of a method for configuring an automobile diagnostic function according to Embodiment 2 of the present invention.

FIG. 3 is a flowchart of a method for configuring an automobile diagnostic function according to Embodiment 2 of the present invention. The method for configuring an automobile diagnostic function provided in this embodiment mainly includes configuring an automobile diagnostic function in an automobile diagnostic application program installed on an automobile diagnostic device. As shown in FIG. 3, the method for configuring an automobile diagnostic function provided in this embodiment may include the following steps.

S201. First function configuration information is obtained from a server.

S202. An automobile diagnostic function group is determined based on the first function configuration information.

For S201, refer to S101. For S202, refer to S102. Details are not described herein again.

S203. An icon corresponding to at least one automobile diagnostic function in the automobile diagnostic function group is displayed in a main menu of an automobile diagnostic application program.

Figure 4:
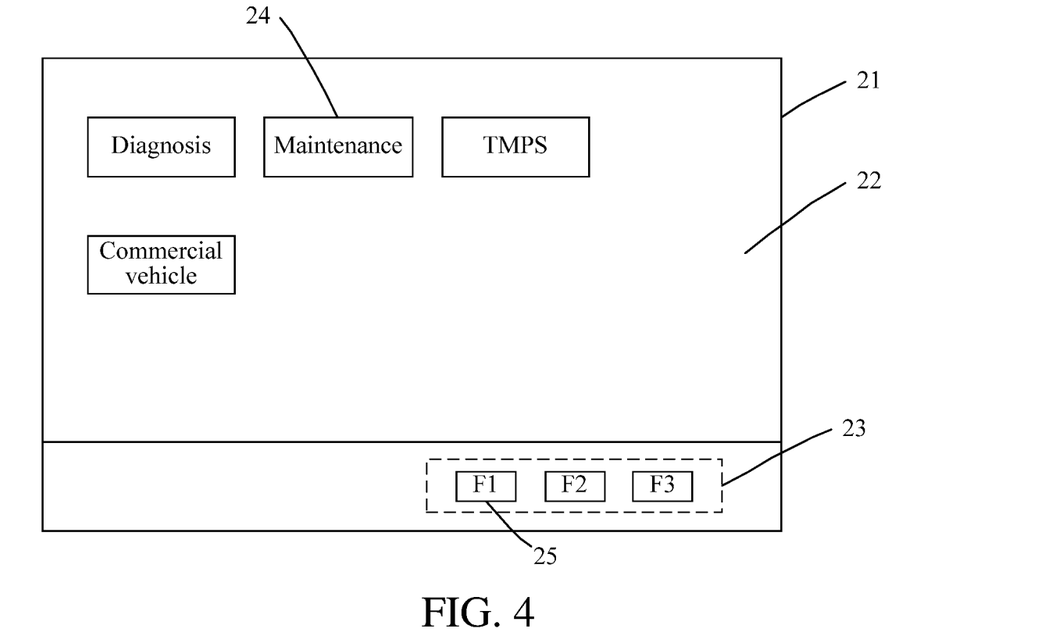
FIG. 4 is a schematic display diagram of an interface of an automobile diagnostic device according to an embodiment of the present invention.

In particular, an automobile diagnostic application program (application or APP) may display a main menu after startup, the main menu providing a menu entry for an automobile diagnostic function. For example, FIG. 4 is a schematic display diagram of an interface of an automobile diagnostic device according to an embodiment of the present invention. As shown in FIG. 4, a main menu 22 of an automobile diagnostic application program may be located above a display interface 21 of an automobile diagnostic device. The main menu 22 of the automobile diagnostic application program may include four icons 24, which are respectively used to indicate a diagnostic function, a maintenance function, a TMPS function, and a commercial vehicle function.

It should be noted that, a quantity of icons displayed in the main menu of the automobile diagnostic application program is not limited in this embodiment. Icons corresponding to all or a part of automobile diagnostic functions in the automobile diagnostic function group may be displayed. A display manner of an icon corresponding to an automobile diagnostic function is not limited in this embodiment of the present invention.

This embodiment provides a method for configuring an automobile diagnostic function. First function configuration information is obtained from a server, a to-be-configured automobile diagnostic function group may be determined based on the first function configuration information, and an icon corresponding to at least one automobile diagnostic function in the automobile diagnostic function group is displayed in a main menu of an automobile diagnostic application program. In this way, flexibility of configuring an automobile diagnostic function is improved, product types are reduced, and product development and maintenance costs are reduced.

Figure 5:
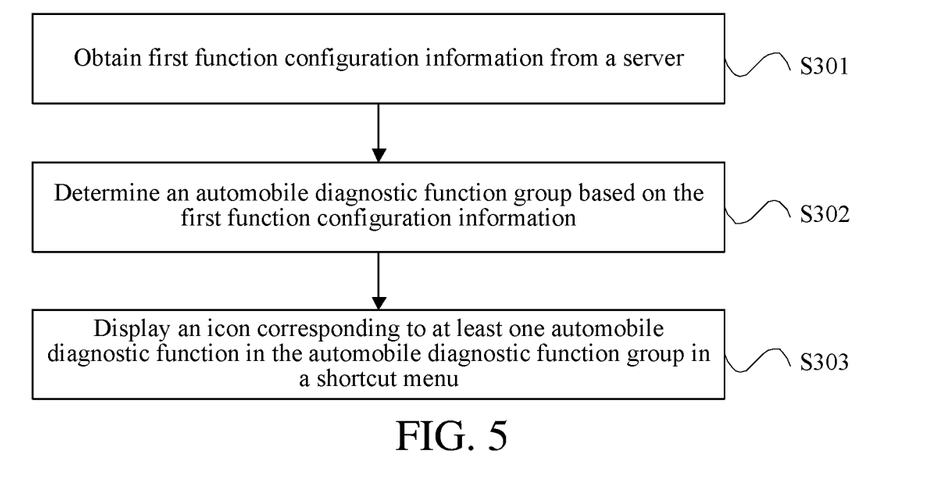
FIG. 5 is a flowchart of a method for configuring an automobile diagnostic function according to Embodiment 3 of the present invention.

FIG. 5 is a flowchart of a method for configuring an automobile diagnostic function according to Embodiment 3 of the present invention. The method for configuring an automobile diagnostic function provided in this embodiment mainly includes configuring an automobile diagnostic function in a desktop shortcut menu of an automobile diagnostic device. As shown in FIG. 5, the method for configuring an automobile diagnostic function provided in this embodiment may include the following steps.

S301. First function configuration information is obtained from a server.

S302. An automobile diagnostic function group is determined based on the first function configuration information.

For S301, refer to S101. For S302, refer to S102. Details are not described herein again.

S303. An icon corresponding to at least one automobile diagnostic function in the automobile diagnostic function group is displayed in a shortcut menu.

In particular, the desktop shortcut menu (System UI) may provide a shortcut menu entry for an automobile diagnostic function from an operating system level. For example, FIG. 4 is a schematic display diagram of an interface of an automobile diagnostic device according to an embodiment of the present invention. As shown in FIG. 4, a desktop shortcut menu 23 may be located below a display interface 21 of an automobile diagnostic device. The desktop shortcut menu 23 may include three shortcut menu entry icons 25 that respectively support three automobile diagnostic functions of F1, F2, and F3.

It should be noted that, a quantity of icons displayed in the desktop shortcut menu is not limited in this embodiment. Icons corresponding to all or a part of automobile diagnostic functions in the automobile diagnostic function group may be displayed.

Optionally, the displaying an icon corresponding to at least one automobile diagnostic function in the automobile diagnostic function group in a shortcut menu may include:

determining N automobile diagnostic functions in the automobile diagnostic function group according to a preset rule, N being an integer greater than or equal to 1; and displaying icons respectively corresponding to the N automobile diagnostic functions in the shortcut menu.

It should be noted that a specific value of N is not limited in this embodiment, for example, 2 or 3. The preset rule is not limited in this embodiment.

Optionally, the determining N automobile diagnostic functions in the automobile diagnostic function group according to a preset rule may include:

determining, based on an order of reading identifiers of automobile diagnostic functions from the first function configuration information, automobile diagnostic functions respectively corresponding to the first N identifiers as the N automobile diagnostic functions.

Optionally, the determining N automobile diagnostic functions in the automobile diagnostic function group according to a preset rule may include:

determining, based on an order of reading identifiers of automobile diagnostic functions from the first function configuration information, automobile diagnostic functions respectively corresponding to the last N identifiers as the N automobile diagnostic functions.

Optionally, the determining N automobile diagnostic functions in the automobile diagnostic function group according to a preset rule may include:

determining, in descending order of weight values corresponding to all automobile diagnostic functions in the automobile diagnostic function group, automobile diagnostic functions respectively corresponding to the first N identifiers as the N automobile diagnostic functions.

A weight value may be preset for each automobile diagnostic function, and the weight value is stored in both the server and the automobile diagnostic device. A specific value of a weight value corresponding to an automobile diagnostic function is not limited in this embodiment.

Certainly, the preset rule may further include other rules, which are not limited herein.

This embodiment provides a method for configuring an automobile diagnostic function. First function configuration information is obtained from a server, a to-be-configured automobile diagnostic function group may be determined based on the first function configuration information, and an icon corresponding to at least one automobile diagnostic function in the automobile diagnostic function group is displayed in a shortcut menu. In this way, flexibility of configuring an automobile diagnostic function is improved, product types are reduced, and product development and maintenance costs are reduced.

Figure 6:
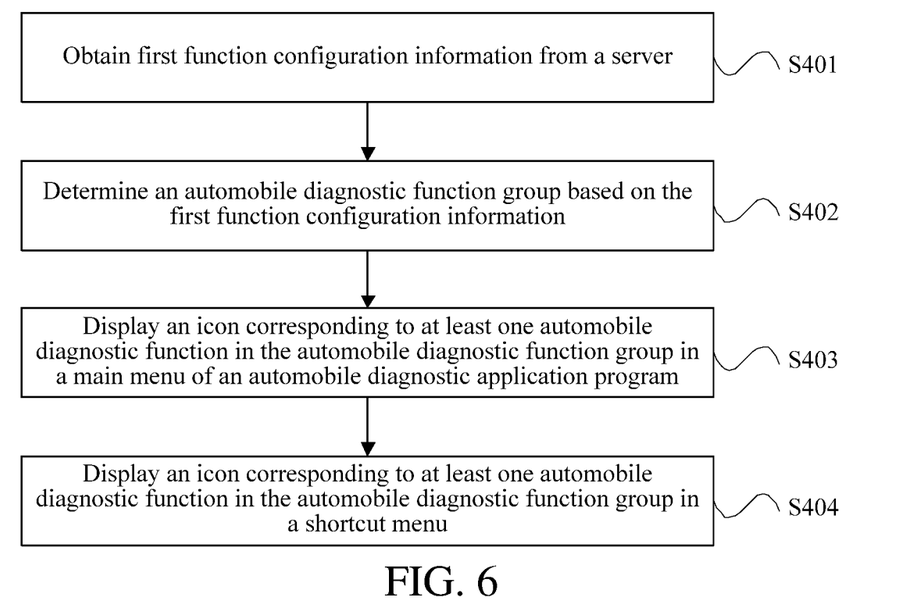
FIG. 6 is a flowchart of a method for configuring an automobile diagnostic function according to Embodiment 4 of the present invention.

FIG. 6 is a flowchart of a method for configuring an automobile diagnostic function according to Embodiment 4 of the present invention. The method for configuring an automobile diagnostic function provided in this embodiment mainly includes configuring an automobile diagnostic function in an automobile diagnostic application program installed on an automobile diagnostic device and in a desktop shortcut menu. As shown in FIG. 6, the method for configuring an automobile diagnostic function provided in this embodiment may include the following steps.

S401. First function configuration information is obtained from a server.

S402. An automobile diagnostic function group is determined based on the first function configuration information.

S403. An icon corresponding to at least one automobile diagnostic function in the automobile diagnostic function group is displayed in a main menu of an automobile diagnostic application program.

S404. An icon corresponding to at least one automobile diagnostic function in the automobile diagnostic function group is displayed in a shortcut menu.

For S401, refer to S101. For S402, refer to S102. For S403, refer to S203. For S404, refer to S303. Details are not described herein again.

A sequence of performing S403 and S404 is not limited in this embodiment.

This embodiment provides a method for configuring an automobile diagnostic function. An icon corresponding to at least one automobile diagnostic function in an automobile diagnostic function group is displayed in a main menu of an automobile diagnostic application program and in a shortcut menu. In this way, flexibility of configuring an automobile diagnostic function is improved, product types are reduced, and product development and maintenance costs are reduced.

In the foregoing embodiment, granted permission corresponding to each automobile diagnostic function in the automobile diagnostic function group may be determined, and corresponding permission is granted in combination with one of the foregoing embodiments. This further enhances flexibility of function configuration.

Figure 7:
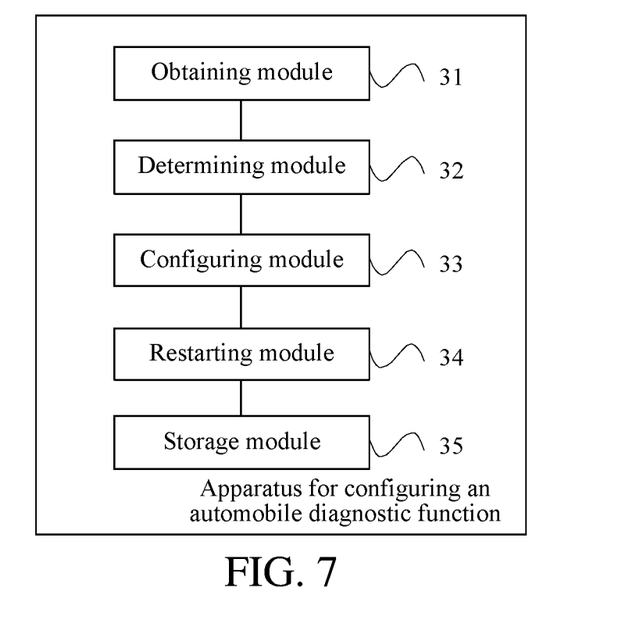
FIG. 7 is a schematic structural diagram of an apparatus for configuring an automobile diagnostic function according to an embodiment of the present invention.

FIG. 7 is a schematic structural diagram of an apparatus for configuring an automobile diagnostic function according to an embodiment of the present invention. The apparatus for configuring an automobile diagnostic function provided in this embodiment may be integrated into an automobile diagnostic device and configured to perform the method for configuring an automobile diagnostic function provided in the embodiments shown in FIG. 2 to FIG. 6. As shown in FIG. 7, the apparatus for configuring an automobile diagnostic function provided in this embodiment may include:

an obtaining module 31 configured to obtain first function configuration information from a server, the first function configuration information including an identifier of at least one automobile diagnostic function;

a determining module 32 configured to determine an automobile diagnostic function group based on the first function configuration information; and a configuring module 33 configured to grant use permission of the automobile diagnostic function group in an automobile diagnostic application program.

Optionally, the determining module 32 is specifically configured to:

determine an automobile diagnostic function corresponding to the identifier of the at least one automobile diagnostic function, and combine the automobile diagnostic function corresponding to the identifier of the at least one automobile diagnostic function into the automobile diagnostic function group.

Optionally, the determining module 32 is further configured to:

if there is a second automobile diagnostic function associated with a first automobile diagnostic function in the automobile diagnostic function group, add the second automobile diagnostic function to the automobile diagnostic function group.

Optionally, the configuring module 33 is specifically configured to:

display an icon corresponding to at least one automobile diagnostic function in the automobile diagnostic function group in a main menu of the automobile diagnostic application program.

Optionally, the configuring module 33 is specifically configured to:

display an icon corresponding to at least one automobile diagnostic function in the automobile diagnostic function group in a shortcut menu.

Optionally, the configuring module 33 is specifically configured to:

determine N automobile diagnostic functions in the automobile diagnostic function group according to a preset rule, N being an integer greater than or equal to 1; and display icons respectively corresponding to the N automobile diagnostic functions in the shortcut menu.

Optionally, the configuring module 33 is specifically configured to:

determine, based on an order of reading identifiers of automobile diagnostic functions from the first function configuration information, automobile diagnostic functions respectively corresponding to the first N identifiers as the N automobile diagnostic functions.

Optionally, the apparatus for configuring an automobile diagnostic function further includes a storage module 35, the storage module 35 being configured to:

store the first function configuration information.

Optionally, the obtaining module 31 is further configured to obtain second function configuration information from the server.

The determining module 32 is further configured to determine whether the second function configuration information is consistent with the first function configuration information.

If no, the determining module 32 is further configured to update the automobile diagnostic function group based on the second function configuration information, and the configuring module 33 is further configured to grant use permission of an updated automobile diagnostic function group in the automobile diagnostic application program.

Optionally, the apparatus for configuring an automobile diagnostic function further includes a restarting module 34.

The obtaining module 31 is further configured to obtain third function configuration information stored locally.

The restarting module 34 is configured to restart an automobile diagnostic device if the third function configuration information is different from the first function configuration information.

The apparatus for configuring an automobile diagnostic function provided in this embodiment is configured to perform the method for configuring an automobile diagnostic function provided in the embodiments shown in FIG. 2 to FIG. 6. A technical principle and a technical effect of the apparatus are similar to those of the method, and details are not described herein again.

Figure 8:
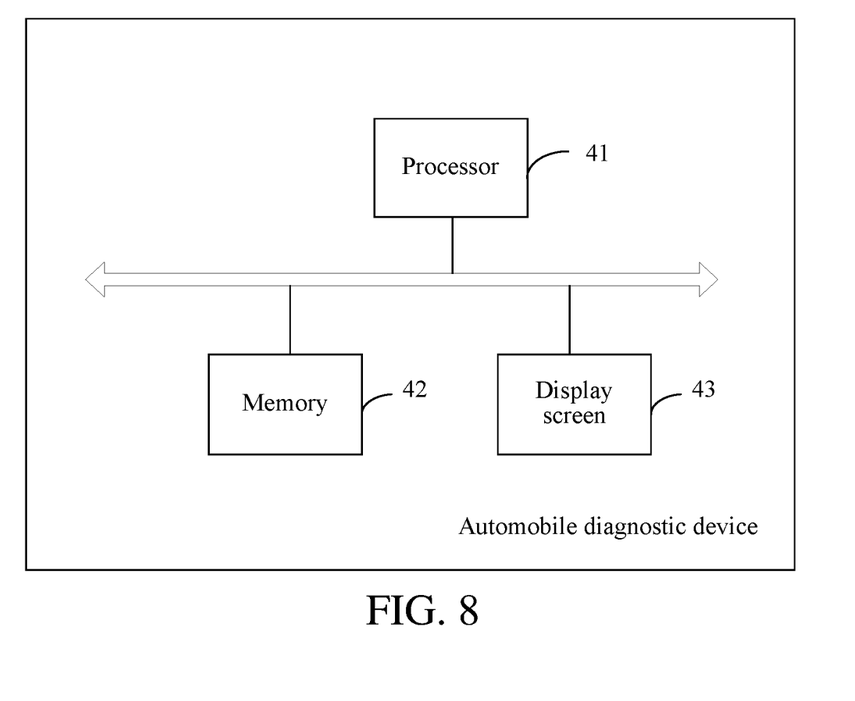
FIG. 8 is a schematic structural diagram of an automobile diagnostic device according to an embodiment of the present invention.

FIG. 8 is a schematic structural diagram of an automobile diagnostic device according to an embodiment of the present invention. A structure, a model, and a type of the automobile diagnostic device are not limited in this embodiment. As shown in FIG. 8, the automobile diagnostic device provided in this embodiment may include a processor 41, a memory 42, and a display screen 43.

The memory 42 is configured to store an instruction.

The processor 41 is configured to run the instruction stored in the memory 42, to perform the method for configuring an automobile diagnostic function provided in the embodiments shown in FIG. 2 to FIG. 6.

The display screen 43 is configured to display a running result of the processor 41. For example, the display screen is configured to display a main menu of an application program or display a desktop menu, such as a shortcut menu on a desktop. In particular, the display screen 43 may display an icon corresponding to an automobile diagnostic function at a corresponding position based on the automobile diagnostic function determined by the processor 41 and granted permission corresponding to each function.

An operating system installed on the automobile diagnostic device and a type of automobile diagnostic software are not limited in this embodiment. For example, the automobile diagnostic device may adopt an Android operating system.

The automobile diagnostic device provided in this embodiment is configured to perform the method for configuring an automobile diagnostic function provided in the embodiments shown in FIG. 2 to FIG. 6. A technical principle and a technical effect of the device are similar to those of the method, and details are not described herein again.

An embodiment of the present invention further provides an automobile diagnostic device. A structure, a model, and a type of the automobile diagnostic device are not limited in this embodiment. The automobile diagnostic device provided in this embodiment may include the apparatus for configuring an automobile diagnostic function provided in the embodiment shown in FIG. 7.

An operating system installed on the automobile diagnostic device and a type of automobile diagnostic software are not limited in this embodiment. For example, the automobile diagnostic device may adopt an Android operating system.

The automobile diagnostic device provided in this embodiment includes the apparatus for configuring an automobile diagnostic function provided in the embodiment shown in FIG. 7. A technical principle and a technical effect of the device are similar to those of the apparatus, and details are not described herein again.

A person of ordinary skill in the art may understand that all or some of the steps of the foregoing method embodiments may be implemented by a program instructing relevant hardware. The aforementioned program may be stored in a computer-readable storage medium. During execution of the program, the steps of the foregoing method embodiments are performed; and the aforementioned storage medium includes various media that can store program code, such as a ROM, a RAM, a magnetic disk, or an optical disc.

The terms "first", "second", "third", "fourth", and the like (if exists) in the specification and the claims of this application and the foregoing accompanying drawings are used for distinguishing similar objects, and do not need to be used for describing a particular sequence or order. It should be understood that data used in this way is interchangeable in a suitable case, so that the embodiments of this application described herein can be implemented in a sequence in addition to the sequence shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Finally, it should be noted that the foregoing embodiments are merely used for describing the technical solutions of the present disclosure, but are not intended to limit the present disclosure. Although the embodiments of the present disclosure are described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the present invention.

What is claimed is:

1. A method for configuring an automobile diagnostic function, comprising steps of:
   obtaining first function configuration information from a server, the first function configuration information comprising an identifier of at least one automobile diagnostic function;
   determining an automobile diagnostic function group based on the first function configuration information, wherein the determining step comprises: determining an automobile diagnostic function corresponding to the identifier of the at least one automobile diagnostic function, and combining the automobile diagnostic function corresponding to the identifier of the at least one automobile diagnostic function into the automobile diagnostic function group,
   if there is a second automobile diagnostic function associated with a first automobile diagnostic function in the automobile diagnostic function group, adding the second automobile diagnostic function to the automobile diagnostic function group; and
   granting use permission of the automobile diagnostic function group in an automobile diagnostic application program.

2. The method according to claim 1, wherein the granting use permission of the automobile diagnostic function group in an automobile diagnostic application program comprises:
   displaying an icon corresponding to at least one automobile diagnostic function in the automobile diagnostic function group in a main menu of the automobile diagnostic application program.

3. The method according to claim 1, wherein the granting use permission of the automobile diagnostic function group in an automobile diagnostic application program comprises:
   displaying an icon corresponding to at least one automobile diagnostic function in the automobile diagnostic function group in a shortcut menu.

4. The method according to claim 3, wherein the displaying an icon corresponding to at least one automobile diagnostic function in the automobile diagnostic function group in a shortcut menu comprises:
   determining N automobile diagnostic functions in the automobile diagnostic function group according to a preset rule, N being an integer greater than or equal to 1; and
   displaying icons respectively corresponding to the N automobile diagnostic functions in the shortcut menu.

5. The method according to claim 4, wherein the determining N automobile diagnostic functions in the automobile diagnostic function group according to a preset rule comprises:
   determining, based on an order of reading identifiers of automobile diagnostic functions from the first function configuration information, automobile diagnostic functions respectively corresponding to the first N identifiers as the N automobile diagnostic functions.

6. The method according to claim 1, further comprising:
   storing the first function configuration information.

7. The method according to claim 6, after the storing the first function configuration information, further comprising:
   obtaining second function configuration information from the server;
   determining whether the second function configuration information is consistent with the first function configuration information; and
   if no, updating the automobile diagnostic function group based on the second function configuration information, and granting use permission of an updated automobile diagnostic function group in the automobile diagnostic application program.

8. An apparatus for configuring an automobile diagnostic function, comprising:
   an obtaining module configured to obtain first function configuration information from a server, the first function configuration information comprising an identifier of at least one automobile diagnostic function;
   a determining module configured to determine an automobile diagnostic function group based on the first function configuration information, wherein the determining module is specifically configured to: determine an automobile diagnostic function corresponding to the identifier of the at least one automobile diagnostic function, and combine the automobile diagnostic function corresponding to the identifier of the at least one automobile diagnostic function into the automobile diagnostic function group: if there is a second automobile diagnostic function associated with a first automobile diagnostic function in the automobile diagnostic function group, add the second automobile diagnostic function to the automobile diagnostic function group; and
   a configuring module configured to grant use permission of the automobile diagnostic function group in an automobile diagnostic application program.

9. The apparatus according to claim 8, wherein the configuring module is specifically configured to:
  display an icon corresponding to at least one automobile diagnostic function in the automobile diagnostic function group in a main menu of the automobile diagnostic application program.

10. The apparatus according to claim 8, wherein the configuring module is specifically configured to:
  display an icon corresponding to at least one automobile diagnostic function in the automobile diagnostic function group in a shortcut menu.

11. The apparatus according to claim 10, wherein the configuring module is specifically configured to:
  determine N automobile diagnostic functions in the automobile diagnostic function group according to a preset rule, N being an integer greater than or equal to 1; and
  display icons respectively corresponding to the N automobile diagnostic functions in the shortcut menu.

12. The apparatus according to claim 11, wherein the configuring module is specifically configured to:
  determine, based on an order of reading identifiers of automobile diagnostic functions from the first function configuration information, automobile diagnostic functions respectively corresponding to the first N identifiers as the N automobile diagnostic functions.

13. The apparatus according to claim 8, further comprising a storage module, the storage module being configured to:
  store the first function configuration information.

14. The apparatus according to claim 13, wherein the obtaining module is further configured to obtain second function configuration information from the server;
  the determining module is further configured to determine whether the second function configuration information is consistent with the first function configuration information; and
  if no, the determining module is further configured to update the automobile diagnostic function group based on the second function configuration information, and the configuring module is further configured to grant use permission of an updated automobile diagnostic function group in the automobile diagnostic application program.

15. An automobile diagnostic device, comprising a processor, a memory, and a display screen,
  the memory being configured to store an instruction;
  the processor being configured to run the instruction stored in the memory to:
  obtain first function configuration information from a server, the first function configuration information comprising an identifier of at least one automobile diagnostic function;
  determine an automobile diagnostic function group based on the first function configuration information, determine an automobile diagnostic function corresponding to the identifier of the at least one automobile diagnostic function, and combine the automobile diagnostic function corresponding to the identifier of the at least one automobile diagnostic function into the automobile diagnostic function group if there is a second automobile diagnostic function associated with a first automobile diagnostic function in the automobile diagnostic function group, add the second automobile diagnostic function to the automobile diagnostic function group; and
  grant use permission of the automobile diagnostic function group in an automobile diagnostic application program; and
  the display screen being configured to display a running result of the processor.

* * * * *